Feb. 16, 1954  W. N. LUNDAHL ET AL  2,669,662
X-RAY THICKNESS GAUGE

Filed July 27, 1950  2 Sheets-Sheet 1

INVENTORS
W. N. LUNDAHL
R. L. WRIGHT
BY
ATTORNEY

Feb. 16, 1954 — W. N. LUNDAHL ET AL — 2,669,662
X-RAY THICKNESS GAUGE
Filed July 27, 1950

INVENTORS
W. N. LUNDAHL
R. L. WRIGHT
ATTORNEY

Patented Feb. 16, 1954

2,669,662

UNITED STATES PATENT OFFICE 2,669,662

X-RAY THICKNESS GAUGE

Walter N. Lundahl, Hopkins, Minn., and Robert L. Wright, North Linthicum Heights, Md., assignors to Westinghouse Electric Corporation, East Pittsburgh, Pa., a corporation of Pennsylvania Application July 27, 1950, Serial No. 176,176

7 Claims. (Cl. 250—52)

The present invention relates to X-ray systems and more particularly to an X-ray thickness gauge for the measuring of material such as tin, aluminum, iron, steel or the like, as it comes from the rolling mill.

In a device of this character it is customary to employ a sample of known thickness as a "standard" and to compare the intensity of an X-ray beam, after passing through such "standard" sample, with the intensity of such X-ray beam or one comparable to that passing through the "standard" sample, after the latter has passed through the material to be measured. A thickness gauge of this type is shown and described in the copending application of Walter N. Lundahl, Ser. No. 90,121, filed April 28, 1949, assigned to the same assignee as the present invention and one of the coinventors of the instant invention.

The system of this copending application discloses and claims an automatic sample insertion system which provides for the automatic selection of sample thicknesses in steps of one-thousandth of an inch and ranging from .005 to .199 of an inch. While such system operates satisfactorily, the steps of .001 of an inch are too coarse for thin material, especially tin mill stock, ranging from .005" to approximately .015" and other thin stock up to possibly .030", since the metal is rolled to tolerances far less than .001" and it is utterly impractical to use samples of .0001" steps, due to the non-existence of such samples and the fact that such a large number would be required, even if available.

It is accordingly the primary object of the present invention to provide for artificially changing the thickness of a "standard" sample thus giving a very wide range of sample thicknesses in exceedingly small thickness steps.

Another object of the present invention is the provision of an X-ray thickness gauge in which the "standard" thickness samples are automatically changed over a wide range of thicknesses and in thin steps of the order of ten-thousandths of an inch.

Still further objects of the present invention will become obvious to those skilled in the art by reference to the accompanying drawing wherein.

It is, of course, well known that the intensity of X-rays generated by an X-ray tube is approximately directly proportional to the X-ray current through the tube. We have determined also that, within the range of kilovoltages employed in a thickness gauge for cold roll mills, the intensity of the X-rays is proportional to the square of the voltage across the elements of the X-ray tube. Accordingly, an artificial thickness change is obtained by altering either one of these two variables. Moreover, it is preferable to make the desired changes by altering the kilovoltage across one X-ray tube, since there is a constant current fluctuation due to stabilization of the X-ray tube current in order to obtain constant radiation intensity equality between the two X-ray beams.

Moreover, the percentage change in applied potential to give an artificial thickness change does not vary linearly but exponentially and consequentially, to obtain an artificial thickness change of one-thousandth of an inch (.001) with a standard gauge sample of .010" a much higher voltage differential is required than an artificially inserted .001" differential with a standard gauge sample of .100". Since the system of the thickness gauge is designed to read .001" differential for the full scale of .005" to .199", percentage sensitivity at the low thickness end of the scale is about 10% while that at the high thickness end is about 1%, so that a much smaller percentage difference in kilovoltage between the two X-ray tubes is necessary for thick material than with thin material for the same effect.

Figure 3:
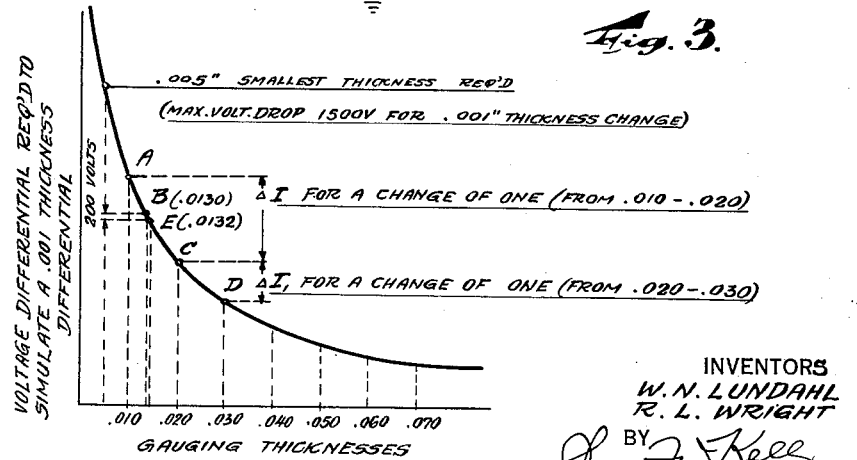
Fig. 3 is a graphic illustration representing an X-ray absorption curve and showing the voltage differential to give a thickness variation.

This may be appreciated from Fig. 3 which, although strictly speaking is actually a sensitivity curve, serves to illustrate the required kilovoltage differential to produce the desired artificial thickness change. In Fig. 3 the abscissa represents gauging thickness in thousandths of an inch and the ordinate voltage differential required to artificially simulate changes of thickness in steps of .001". From the curve of this Fig. 3, it will be obvious, as above mentioned, that a greater kilovoltage differential is required between point A representing the kilovoltage necessary with a "standard" sample gauge of .010" and point B representing .013", which kilovoltage differential progressively decreases non-linearly from point B to point C representing a thickness of .020", and from point C to point D representing a thickness of .030". From this curve it will be obvious that the thinner the material to be gauged, the higher the voltage differential required and at the thinnest material to be gauged of say .005", a voltage drop across one of the X-ray tubes of approximately 1500 volts peak below that of the other X-ray tube gives the equivalent of a synthetic thickness differential of .001", while at a thickness of say .050" a voltage of much less than approximately 1500 volts peak differential will give this .001" synthetic thickness differential. Accordingly, this 1500 volt peak differential for each .001" (at the thinner material to be gauged) results in each 150 volts differential representing one ten-thousandth of an inch. Again referring to the curve of Fig. 3, the point B represents a thickness of .013" obtained by the "standard" sample gauges as shown and described in the above mentioned copending application at a given kilovoltage, while point E represents a synthetic thickness gauge of .0132 by varying the kilovoltage on one of the X-ray tubes to approximately 200 volts below that of the other X-ray tube when a "standard" sample gauge of .013 is used or by varying the kilovoltage by 1700 volts if no standard sample gauge is interposed in the path of the X-ray beam from the "standard" X-ray tube. Also, as will be noted from Fig. 3, the voltage change necessary for a unit of one I will be greater for thicknesses of from .010" to .020", than for a unit of one $I_1$ for thicknesses varying from .020" to .030".

Figure 1:
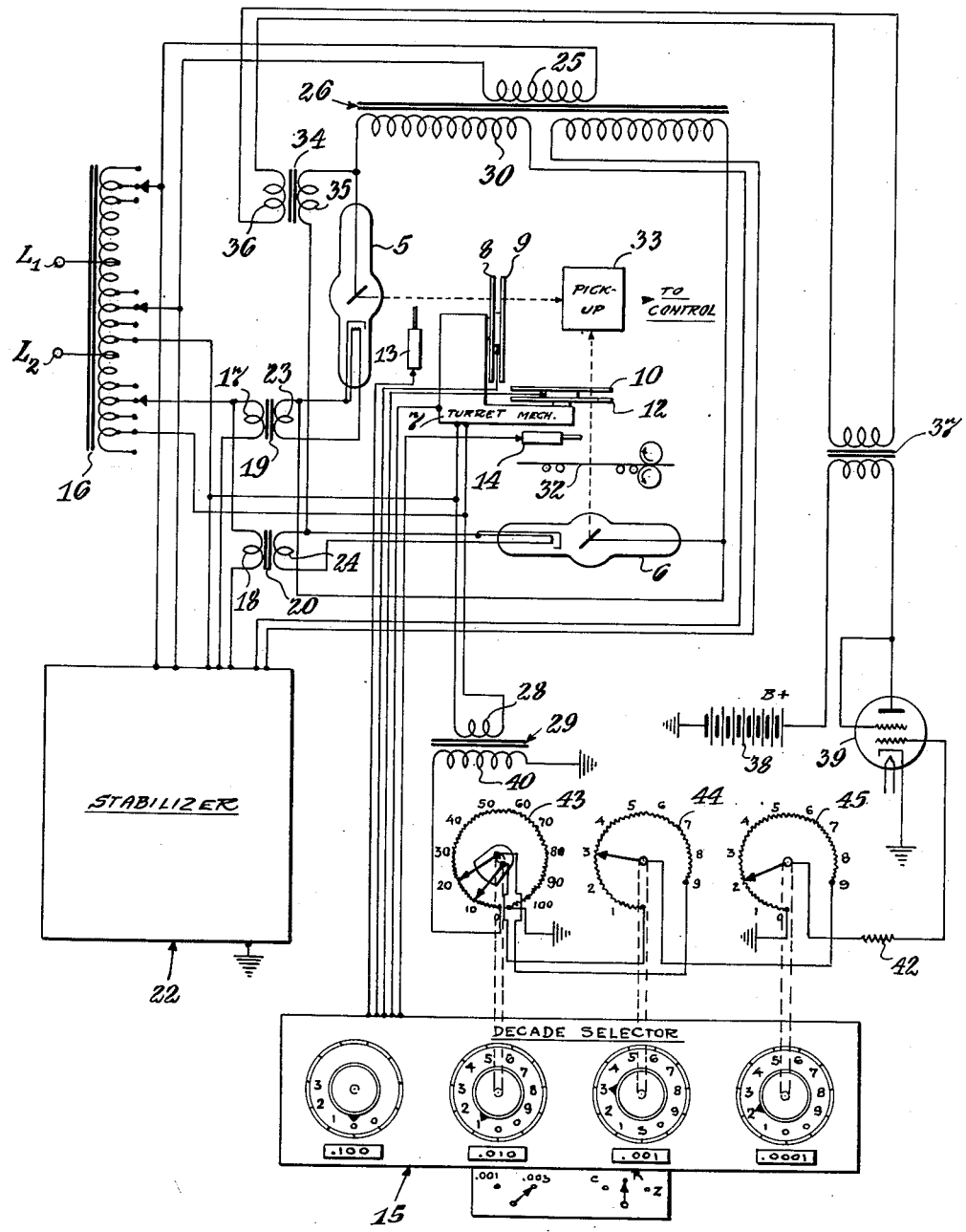
Fig. 1 is a diagrammatic illustration of the X-ray thickness gauge of the present invention wherein the "standard" thickness samples are automatically changed in response to operation by an operator and artificially in exceedingly thin steps of the order of ten-thousandths of an inch.

By reference now to Fig. 1, a system for artificially obtaining thickness changes is therein shown which comprises a "standard" X-ray tube 5 and a "work" X-ray tube 6. The mechanism associated with these two X-ray tubes for measuring thicknesses is identical to that shown and described in the above identified copending application Serial No. 90,121, and since it per se forms no part of the present invention, it is unnecessary to describe the same in detail herein, as reference may be made to such copending application. It should accordingly suffice to say that the turret mechanism 7 is operable to automatically rotate a pair of disks 8 and 9 to position an insert of a preselected hundredths thickness, such for example, as .010" carried by the disk 8, and an insert of preselected thousandths thickness, such as .003" carried by the disk 9, in the X-ray beam emanating from the "standard" X-ray tube 5. Likewise the turret mechanism is operable to automatically rotate a pair of disks 10 and 12, likewise provided with inserts of preselected thicknesses similar to those carried by the disks 8 and 9, in the path of the X-ray beam from the "work" X-ray tube 6 for test purposes, when desired.

A pair of solenoids 13 and 14 are operable to insert a sample gauge in steps of one-tenth thickness (0.1) in the path of the X-ray beam from the "standard" and "work" X-ray tubes, respectively, when desired, by operation of the 0.10 dial on the decade selector 15 while the .010 dial and the .001 dial on this decade selector causes operation of the disks 8 and 9. An auto-transformer 16 is connected to the customary commercial source of supply L1—L2 of 215–230 volts, while the primary windings 17 and 18 of the respective cathode heating transformers 19 and 20, are connected through the "stabilizer" 22 to appropriate variable voltage taps on the auto-transformer 16. Secondary winding 23 of the low-tension heating transformer 19 is connected to the cathode of "standard" X-ray tube 5 and similarly the secondary winding 24 of low-tension heating transformer 20 is connected to the cathode of "work" X-ray tube 6. Still further variable voltage taps are provided on the auto-transformer 16 for supplying a selected voltage to the primary winding 25 of high-tension transformer 26 with this same voltage being supplied to the "stabilizer" 22.

Additional taps on the auto-transformer 16 are provided for supplying an appropriate voltage for operating the turret motors and to the primary winding 28 of a constant voltage transformer 29 which voltage is 180° out of phase with respect to the voltage supplied to the primary winding 25 of the high voltage transformer 26. The high voltage secondary winding 30 of transformer 26 supplies a high voltage alternately to the "standard" and "work" X-ray tubes 5 and 6, respectively, with such secondary 30 being connected at the mid-point thereof to the stabilizer 22. Since this "stabilizer" 22 per se forms no part of the present invention, but is shown and described in detail in copending application Serial No. 138,095, filed January 12, 1950, in the name of Walter N. Lundahl one of the applicants herein, it is believed unnecessary to describe such "stabilizer" in detail. It should accordingly suffice to say that such "stabilizer" operates to maintain a constancy of equal X-ray tube current through both X-ray tubes at all times.

As will also be noted from Fig. 1, the X-ray beam from the respective X-ray tubes 5 and 6 and after passing through the gauge disk inserts, as well as the material 32 to be gauged as it comes from the rolling mill, impinges upon a "pick-up" 33. The latter also per se forms no part of the present invention and it is accordingly believed unnecessary that it be described in detail herein. Briefly, however, such "pick-up" includes a photo-multiplier tube responsive to incident light falling thereon which, through appropriate control circuits, causes operation of the rollers of the rolling mill to alter the thickness of the material under test as it comes from the mill, or operates an indicator to show an operator that such material has varied plus or minus from the desired standard thickness. The system thus far described differs very little from that shown and described in the above mentioned copending applications.

The present invention, however, includes a transformer 34 having its secondary winding 35 in series with the "work" X-ray tube 6 while its primary winding 36 is connected, through an insulating transformer 37 of a one to one ratio, to a D. C. voltage supply source, such as a battery 38 and under the control of a beam power tetrode tube 39 having its plate circuit in series with the battery 38 and the primary winding of the insulating transformer 37. In order to superimpose a pulsating voltage on the high voltage supplied to the "work" X-ray tube 6, the cathode-grid circuit of tetrode 39 is impressed with a voltage from the secondary winding 40 of transformer 29 which has its primary winding 28 180° out of phase with respect to the primary winding 25 of the high tension transformer 26, thus effectively increasing the total voltage supplied to the "work" X-ray tube by a predetermined amount above that supplied the "standard" X-ray tube from the high voltage secondary winding 30.

Also included in the cathode-grid circuit for tetrode 39 is a fixed resistance 42 and three variable rheostats 43, 44 and 45. By reference to Fig. 1, it will be noted that such variable rheostats actually constitute an additional element or deck on the respective tandem switches of the decade selector 15. For example, the double-armed rheostat 43 is connected to the shaft which is rotated by the 0.010" knob, the movable arm of rheostat 44 is connected to the shaft operated by the 0.001" knob, and the movable arm of rheostat 45 is connected to the shaft operated by the 0.0001" knob of the decade selector 15. Accordingly, movement of the .010" knob to align its pointer with the numeral "1," sets this particular selector switch to cause a standard thickness insert, as carried by the disk 8, to be interposed in the path of the X-ray beam from "standard" X-ray tube 5, in the manner explained in the above mentioned copending application Ser. No. 90,121. At the same time one arm of rheostat 43 will register with the "10" graduation while its other arm registers with the "20" graduation which thus includes a definite amount of the resistance of rheostat 43 in the cathode-grid circuit of tetrode tube 39.

Likewise movement of the .001" knob to align its pointer with the numeral "3," operates this selector switch to cause a standard thickness insert of .003" carried by the disk 9 to be interposed in the path of the beam from standard X-ray tube 5 which, together with the .010" insert of disk 8, thus makes the total of the thickness inserts .013". The movable arm of rheostat 44 is simultaneously moved to register with the number "3" which thus includes a portion of the resistance of rheostat 44 in the cathode-grid circuit of tetrode tube 39 along with the resistance of rheostat 43. However, it will be noted that, due to the relationship between rheostats 43 and 44, each graduation of rheostat 44 inserts sufficient resistance in the cathode-grid circuit to cause a voltage drop in steps of tenths, compared to the voltage drop caused in such circuit by the resistance of rheostat 43. In other words, rheostat 44 enables a finer adjustment in terms of tenths to that possible with rheostat 43 above.

The same operation results from rheostat 45 since its movable arm is rotated by the shaft to which the .0001" knob is connected and assuming the pointer is moved to the number "2," graduation corresponding to .0002" as shown in the drawing, the movable rheostat arm is likewise moved to its number "2" position. This accordingly adds the additional resistance of the rheostat 45 to the cathode-grid circuit for tetrode tube 39, which again corresponds to units in tenths of that of rheostat 44, along with the resistance of the series connected rheostats 42, 43 and 44.

The settings of the rheostats 43, 44 and 45 accordingly control the A. C. biasing voltage applied to the cathode-grid circuit of the tetrode tube 39 and since, as above mentioned, this voltage is 180° out of phase with the primary winding 25 of high voltage transformer 26, tetrode tube 39 is made conductive during that half wave of the alternating current cycle when "standard" X-ray tube 5 is non-conductive and hence not generating X-rays. However, since "work" X-ray tube 6 is thus generating X-rays simultaneously with conduction by tetrode 39, a high current pulsating voltage is supplied by the D. C. source 38, through cyclically conducting tetrode tube 39 and insulating transformer 37 to transformer 34. This pulsating voltage supplied to transformer 34 superimposes a voltage of opposite phase on the high voltage being supplied at the same moment by the high voltage secondary winding 30 to "work" X-ray tube 6.

The effect of this superimposed voltage is to increase the magnitude of the actual high voltage supplied to "work" X-ray tube 6 to a value above that supplied during the next half-cycle to the "standard" X-ray tube 5. The actual value of such increased high voltage supplied to "work" X-ray tube 6 is determined by the biasing voltage impressed upon the grid of tetrode tube 39 by transformer 29, as controlled by the rheostats 43, 44 and 45. At the settings of these rheostats as shown the biasing voltage supplied to the grid of tetrode tube 39 would correspond to a thickness of .0002". This may be better appreciated by again referring to Fig. 3 where it will be noted that point B on the curve may be said to represent the voltage applied to the X-ray tubes to measure the thickness of material as compared with standard thickness samples of .0130". Point E on the other hand represents the voltage differential between the two X-ray tubes, which at this particular portion of the curve amounts to about 200 volts, in order to obtain a synthetic thickness of .0002" to thus make the standard to be gauged total .0132".

Because as hereinabove stated, the voltage curve is non-linear, it is necessary to provide the three rheostats 43, 44 and 45, rather than a single rheostat such as 45, so that the total resistance in the cathode-grid circuit of tetrode tube 39 is varied non-linearly, as the control knobs are altered on the decade selector to give the various desired thickness settings. Accordingly, at the smallest thickness required of .005" the voltage differential between the two X-ray tubes is greatest and this same differential thus applies with respect to the biasing voltage for the grid of tetrode tube 39. As the thickness of the material to be gauged increases, the voltage differential decreases as shown by the curve of Fig. 3 and by the same token the grid bias of tetrode tube 39 likewise decreases.

Figure 2:
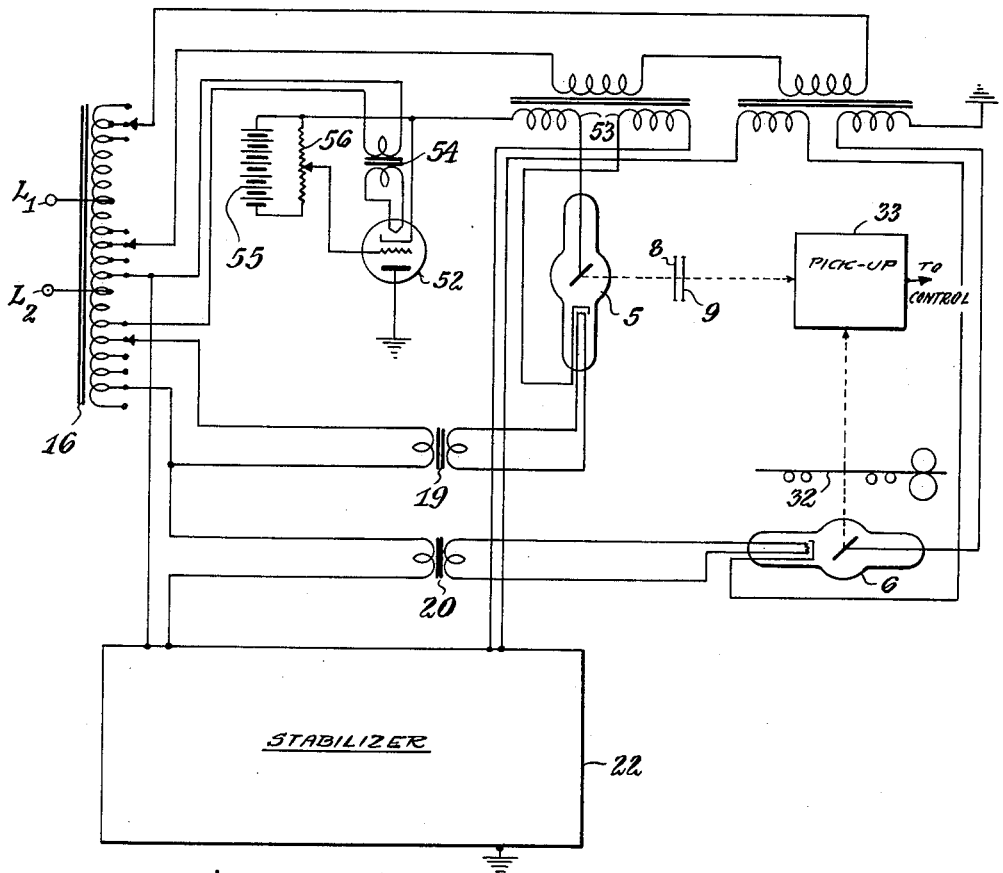
Fig. 2 is a diagrammatic illustration showing a modification which the X-ray thickness gauge of the present invention may take.

The modification of the present invention as shown in Fig. 2 differs somewhat from the preferred embodiment illustrated in Fig. 1, in that the actual high potential supplied to the "standard" X-ray tube is reduced below that supplied to the "work" X-ray tube 6 by the arrangement of Fig. 2, instead of increasing the voltage supplied the "work" X-ray tube 6 above that of the standard X-ray tube 5, as shown and described in Fig. 1. By reference now more specifically to Fig. 2, the circuit arrangement including the stabilizing circuit for the X-ray tubes 5 and 6 is identical to that shown and described in Patent No. 2,492,304 granted December 27, 1949 to the same applicants of the present invention and for a detailed description of the energizing and stabilizing arrangement reference may be made to such patent. For purposes of illustrating this particular modification of the present invention, it should suffice to say that the high voltage energizing circuit for "standard" X-ray tube 5 includes a control tube 52, having its plate circuit connected to the high potential supply source, comprising the split secondary winding 53, and to "standard" X-ray tube 5. The filamentary cathode of this control tube receives heating current from a transformer 54 having its primary winding connected to suitable voltage tap on auto-transformer 16, in the same manner that heating transformers 19 and 20 for the X-ray tube cathodes are connected to such source.

The control grid of control tube 52 receives a biasing voltage from a source of supply such as a battery 55 through a variable resistance 56 which is operable to select a desired amount of biasing voltage for the grid. With proper biasing voltage on the grid, the filament-plate circuit of the control tube 52 is thus made to pass only a desired value of high voltage to the "standard" X-ray tube 5 which is maintained below the magnitude of the high voltage supplied during alternate half-cycles to the "work" X-ray tube 6. Again, as above mentioned, the magnitude of the grid biasing potential on tube 52 determines the magnitude of the voltage differential between the two X-ray tubes and such differential corresponds to a synthetic thickness setting in terms of ten thousandths of an inch, depending upon the total thickness of the desired standard gauge which varies non-linearly as again shown by the curve of Fig. 3.

From the foregoing, it should be obvious to those skilled in the art that an X-ray thickness gauge is provided by the present invention in which a synthetic gauge thickness in terms of ten thousandths of an inch is readily obtained. Moreover, since the "standard" gauge can be readily preset for thickness in such small order of magnitude as ten-thousandths of an inch, the entire thickness gauge is accurately operable over a considerably wider range including exceptionally thin material than has been heretofore possible.

Although two embodiments of the present invention have been shown and described, it will be understood that still further modifications thereof may be made without departing from the spirit and scope of the appended claims.

We claim:
1. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, and electrical means connected with the source of supply for one of said X-ray sources and operable by an operator to vary the energy supplied to said X-ray source by a preselected amount compared with the energy supplied to the other of said X-ray sources to cause a difference in the intensity of the X-ray beam from said sources corresponding to a preselected synthetic thickness for completing a standard thickness with which the material to be measured is compared.

2. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, remotely operable means disposed adjacent the path of the "standard" X-ray beam and provided with a plurality of gauge members of various known thicknesses movable into a position to intercept the "standard" X-ray beam, selector means electrically connected to said remotely operable means and operable by an operator to preselect the particular gauge members interposed at a given moment in the path of the "standard" X-ray beam for partially establishing the standard thickness for the material to be measured, and control means electrically connected to one of said X-ray sources and operable to cause a variation in the energy supplied to the latter compared with the energy supplied to the other of said X-ray sources, to cause a difference in intensity of the X-ray beams from said sources corresponding to a preselected synthetic thickness differential in the standard thickness as partially established by said remotely operable means of the magnitude of one-thousandth of an inch to ten-thousandths of an inch, to completely establish the standard thickness for the material to be measured.

3. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, remotely operable means disposed adjacent the path of the "standard" X-ray beam and provided with a plurality of gauge members of various known thicknesses movable into a position to intercept the "standard" X-ray beam, selector means electrically connected to said remotely operable means and operable by an operator to preselect the particular gauge members interposed at a given moment in the path of the "standard" X-ray beam for partially establishing the standard thickness for the material to be measured, and control means operable simultaneously with said selector means and electrically connected to one of said X-ray sources to cause a variation in the energy supplied to the latter compared with the energy supplied to the other of said X-ray sources, to produce a difference in the intensity of the X-ray beams from said sources corresponding to a preselected synthetic thickness differential in the standard thickness as partially established by said remotely operable means of the magnitude of one-thousandth of an inch to ten-thousandths of an inch, to completely establish the standard thickness for the material to be measured.

4. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, remotely operable means disposed adjacent the path of the "standard" X-ray beam and provided with a plurality of gauge members of various known thicknesses movable into a position to intercept the "standard" X-ray beam, selector means electrically connected to said remotely operable means and operable by an operator to preselect the particular gauge members interposed at a given moment in the path of the "standard" X-ray beam for partially establishing the standard thickness for the material to be measured, and means for varying the kilovoltage supplied to one of said X-ray sources by a preselected amount compared with the kilovoltage supplied to the other of said X-ray sources including a variable resistor and a control tube electrically associated with the source of energy for the variable X-ray source, and operable to cause an attendant difference in the intensity of the X-ray beams from said sources corresponding to a preselected synthetic differential in the standard thickness as partially established by said remotely operable means of the magnitude of one-thousandth of an inch to ten-thousandths of an inch, to completely establish the standard thickness for the material to be measured.

5. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, remotely operable means disposed adjacent the path of the "standard" X-ray beam and provided with a plurality of gauge members of various known thicknesses movable into a position to intercept the "standard" X-ray beam, selector means electrically connected to said remotely operable means and operable by an operator to preselect the particular gauge members interposed at a given moment in the path of the "standard" X-ray beam for partially establishing the standard thickness for the material to be measured, and means for superimposing a voltage on the kilovoltage supply for said "work" X-ray source to increase the total applied voltage above that supplied to said "standard" X-ray source comprising a transformer connected to a source of energy through a discharge device having a control electrode, a circuit for the control electrode of said discharge device including a source of alternating current out of phase with that of the kilovoltage supply for said "standard" X-ray source, and a plurality of series connected variable resistors operable simultaneously with said selector means to cause a preselected variation in the voltage supplied to the control electrode of said discharge device with an accompanying increase in the voltage superimposed on the kilovoltage supply for said "work" X-ray source and an attendant difference in the intensity of the X-ray beams from said sources corresponding to a preselected synthetic thickness differential in the standard thickness as partially established by said remotely operable means of the magnitude of one-thousandth of an inch to ten-thousandths of an inch, to completely establish the standard thickness for the material to be measured.

6. An X-ray thickness gauge for measuring material thickness comprising a "standard" source of X-rays and a "work" source of X-rays, means responsive to the intensity of the "standard" X-ray beam and the "work" X-ray beam and operable to cause a registration of the intensity of said X-ray beams as a measure of material thickness when interposed in the path of said "work" X-ray beam, remotely operable means disposed adjacent the path of the "standard" X-ray beam and provided with a plurality of gauge members of various known thicknesses movable into a position to intercept the "standard" X-ray beam, selector means electrically connected to said remotely operable means and operable by an operator to preselect the particular gauge members interposed at a given moment in the path of the "standard" X-ray beam for partially establishing the standard thickness for the material to be measured, and means for decreasing the kilovoltage supplied to said "standard" X-ray source by a preselected amount below the kilovoltage supplied to said "work" X-ray source comprising a discharge device provided with a control electrode and interposed in the high voltage supply circuit for said "standard" X-ray source, a circuit for the control electrode of said discharge device including a variable resistor operable to preselect the voltage supplied to said control electrode to cause said preselected decrease in the kilovoltage supplied to said "standard" X-ray source and to produce a difference in the intensity of the X-ray beams from said sources corresponding to a preselected synthetic differential in the standard thickness as partially established by said remotely operable means of the magnitude of one-thousandth to ten-thousandths of an inch, to completely establish the standard thickness for the material to be measured.

7. An X-ray thickness gauge, comprising: first and second X-ray sources having power supply circuits; means for interposing work material the thickness of which is to be measured, in the path of X-rays from said first source; means for interposing a standard material in the path of X-rays from said second source, means for comparing the intensity of X-rays after passing through said materials to obtain a measure of the thickness of the work material; and electrical means connected in the power supply circuit of said second source to vary the energy supplied thereto by a preselected amount compared to the energy supplied to said first source, to cause a difference in intensity of X-rays from said second source corresponding to a preselected synthetic thickness of said standard material.

WALTER N. LUNDAHL.
ROBERT L. WRIGHT.

References Cited in the file of this patent
UNITED STATES PATENTS

| Number | Name | Date |
|---|---|---|
| 2,467,812 | Clapp | Apr. 19, 1949 |
| 2,503,075 | Smith | Apr. 4, 1950 |
| 2,542,822 | Longini | Feb. 20, 1951 |
| 2,554,041 | Lundahl | May 22, 1951 |
| 2,565,734 | Lundahl | Aug. 28, 1951 |